United States Patent Office 3,249,507
Patented May 3, 1966

3,249,507
GAS COOLED NUCLEAR REACTOR SYSTEM WITH IMPROVED FLOWPATH AND SHIELD ARRANGEMENT
Jean Gondoin, Saint-Germain-en-Laye, Roger Lecler, Saint-Amand-les-Eaux, and Marcel Kadosch, Saint-Cloud, France, assignors to Electricite de France (Service National), Paris, France
Filed Dec. 16, 1963, Ser. No. 330,984
Claims priority, application France, Sept. 20, 1963, 948,255
3 Claims. (Cl. 176—59)

This invention relates to gas-cooled nuclear reactor assemblies of the "built-in" exchanger type and more specifically relates to improvements in biological shields for such reactor assemblies. Prior art reactors of the type commonly referred to as having "built-in" or "integrated" exchangers comprise, in a common pressure vessel, heat exchangers for thermal exchange between the gas coolant (generally carbon dioxide) and a secondary fluid (generally water and/or steam), the reactor core and a biological shield between the heat exchangers and the core.

In a preferred construction, the core is located above the heat exchanger. The pressure vessel may consist of a prestressed concrete vessel which provides both containment and biological protection against radiation from the core and gas coolant loop.

A primary object of the invention is to provide a reactor assembly of the built-in exchanger type having an improved biological shield construction.

Another object of the invention is to provide a nuclear reactor assembly of the built-in heat exchanger type having a biological shield insuring protection of the heat exchangers against direct radiation from the core and impressing a minimum of head loss to the primary coolant flow.

Other objects and features of the invention will appear from the following description which refers to the accompanying drawings wherein.

Figure 1:
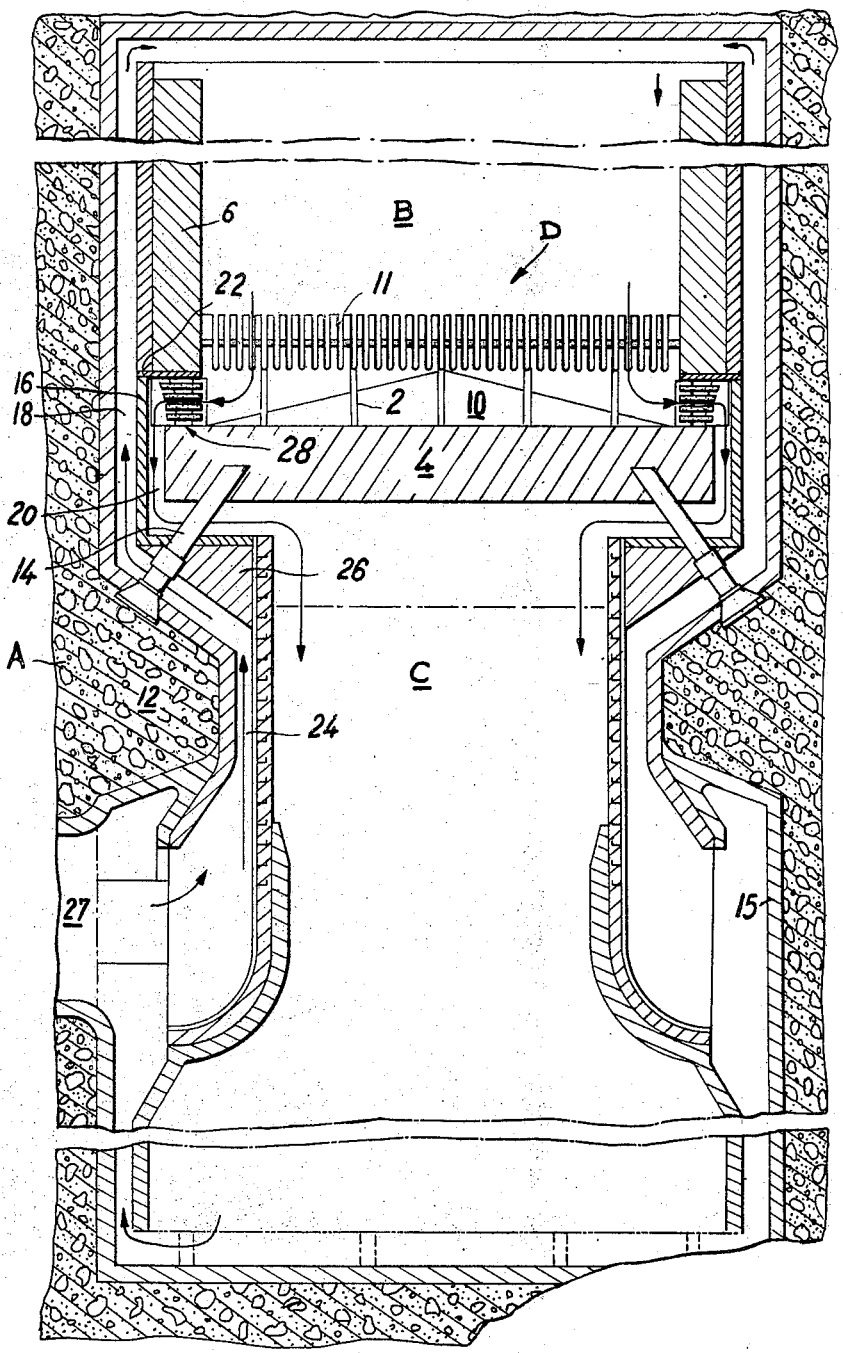
FIG. 1 is a schematic vertical cross-section view of a nuclear reactor assembly according to one embodiment of the invention.

Referring to FIG. 1, there is shown a nuclear reactor broadly comprising a pressure vessel A, the reactor core unit B, the heat exchanger C and the biological shield D. The vessel A consists of a prestressed concrete innerly lined with a gas-tight metal "skin" for containment of the pressure which prevails in the chamber limited by the vessel and for biological protection of the operators.

The reactor core unit B and heat exchanger C are schematically indicated with dash-dot lines. The core unit B consists of a stack of solid moderator bars assembled together in columns and resting on a stack plate (not shown) which transmits its load to a base plate 4 through the intermediary of pillars 2. A reflector shield 6 of moderator material surrounds the core. There are formed within the stack a series of vertical channels (not shown) which accommodate fuel elements. These channels open into the space 10 which constitutes a collector for the primary heat-transfer fluid (usually carbon dioxide gas) through debris collectors such as 11 which pass through the stack plate and which are perforated so as to permit the fluid to flow therethrough, and which are commonly referred to as "catchpots." The base plate is supported on a corbel 12 of the pressure vessel A, which is lined with a "skin" 15 for providing both fluid-tightness and heat insulation through the intermediary of a series of pillars 14 so designed as to permit thermal expansion of the base plate. A metallic wall 16 constituting a jacket divides the space between the wall of pressure vessel A and the base plate 4 into two concentric annular ducts 18 and 20. The top end of the wall 16 is joined in leak-tight manner at 22 to the reflector 6 and its bottom end is joined in a similar manner to the casing which contains the exchanger C. This casing forms with the wall of the pressure vessel A an annular duct 24 through which the primary fluid which has just been cooled in the exchanger flows upwardly towards the duct 18 and from there towards the top face of the reactor core.

The base plate 4 is formed of a solid member which absorbs the radiation emitted by the core in the direction of the exchanger. The term "solid" must be interpreted as designating a member in which no provision is made for any conduit for the passage of primary fluid from the collector 10 to the exchangers, but not in any sense as indicating that this member is homogeneous: it can in fact have very different designs and can be, for example, constituted by an alternate assembly of neutron-absorbing material and moderator material, by a structure of material which ensures mechanical strength and a packing of neutron and gamma absorbing material, etc. . . . The base plate 4 can if necessary be fitted with a circulation system through which a cooling fluid circulates.

The primary fluid from the channels of the core B passes into the collector 10 and from there flows around the base plate towards the exchanger, first radially, then axially through the annular duct 20 and finally again radially between the base plate and a ring 26 of neutron-absorbing material which also plays a part in providing biological protection. Blowers (not shown) are provided in the circuit, for instance at 27, for circulating the coolant.

Figure 3:
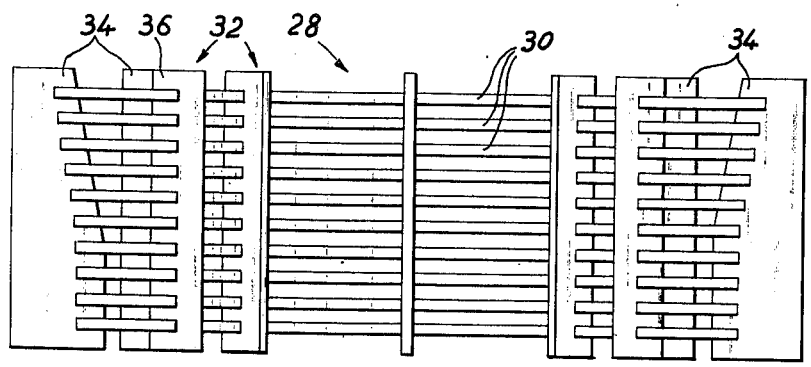
FIG. 3 is a sectional view along line III—III of FIG. 2.
Figure 2:
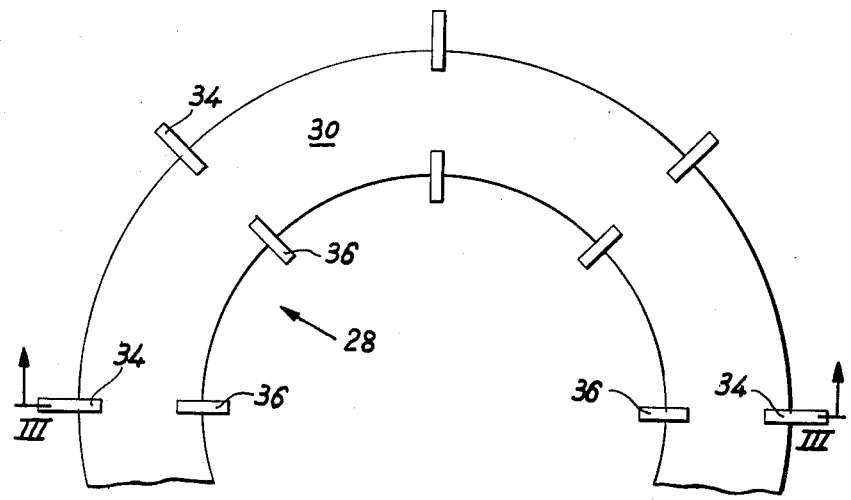
FIG. 2 is a plan view from above the radiation attenuating device illustrated in the reactor of FIG. 1.

In order to prevent any leakage of radiation from the core through the annular duct 20 which would be insufficiently absorbed by the flooring element and by the catchpots 11, the invention makes provision for an additional attenuator element which is generally designated by the reference numeral 28 and one form of embodiment of which, as intended to be interposed between the base of the reflector 6 and the peripheral portion of the top face of the base plate 4, is represented in FIGS. 2 and 3.

The attenuator 28 is constituted by a series of plane annular plates such as 30 of variable external diameter which form between each other radial channels of small depth, for example of the same order as the thickness itself of the plates. The radial dimension of these plates is sufficient to eliminate any direct "streaming" from the base of the core B to the annular conduit 20. The thickness of the plates themselves is sufficient to ensure that any transverse radiation path must necessarily pass through a predetermined minimum thickness of neutron-absorbing material or include a minimum predetermined number of reflections. The total thickness of the attenuator and shape of the free passages are accordingly determined by considerations of aerodynamics or dimensional requirements, but no longer my mandatory shielding requirements. These plates 30, which are formed of neutron-absorbing material (boron steel for example), are held in position relatively to each other by means of a series of partitions which are angularly spaced apart at regular intervals and which will be designated hereinafter as "combs." These combs are secured to the plates 30 by any means such as welding. In the illustrated embodiment, eight combs provided at intervals of 45° and are disposed in planes which pass through the axis of the installation. In order to lighten the weight of the assembly, each comb is divided into two parts 34 and 36 which are respectively secured to the internal and external portions of the plates 30. The external portions 34 can also effect the centering of the unit 28 relatively to the partition 16 while making provision for the necessary clearances in order to compensate for thermal expansions. The unit 28 can rest directly on the base plate 4 and be integral therewith, for example through the intermediary of the combs.

The arrangement which has just been described is obviously not limitative in any respect: it is possible in particular to dispose the unit 28 between the massive biological shield structure and the base plate 4 at the level of this latter at the price of a certain complication inasmuch as the wall 16 would then have to pass through it. Other changes in design will be apparent to those skilled in the art without departing from the scope and spirit of the appendant claims.

We claim:

1. In a gas-cooled nuclear reactor assembly: a prestressed concrete pressure vessel having a vertical axis, defining a pressure tight chamber and of such thickness as to provide biological protection, an annular flange integral with said vessel and projecting inwardly from said vessel into said chamber, a reactor core unit located in said chamber above said flange and provided with vertical channels receiving nuclear fuel elements, heat exchangers located in said chamber below said flange, wall means defining a first annular gas coolant passage between said pressure vessel wall and said core unit and between said pressure vessel and said heat exchangers, biological shield means located between said core unit and said heat exchangers, defining a second annular gas coolant passage with said wall means and supporting said core unit, mechanical support means for transmitting the weight of said core unit and said shield means to said flange, means for circulating gas coolant in closed circuit downward along said channels, past said shield means through said second passage, downward through said heat exchangers, and upward in return to said channels through said first passage, and radiation attenuating means located in said second passage adjacent said shield means and comprising a plurality of parallel spaced annular plates of radiation absorbent material of such length in the direction of flow and in such position as to prevent direct streaming of radiation from said core unit to said exchangers through said second passage.

2. A reactor according to claim 1, wherein said attenuating means further includes a plurality of equiangularly spaced radiation absorbent plates transverse to said annular plates and connecting said annular plates.

3. A reactor assembly according to claim 2, wherein said biological shield means has a horizontal upper surface, said annular plates are horizontal and equidistant and said equiangularly spaced plates are vertical.

References Cited by the Examiner

UNITED STATES PATENTS

| 3,105,805 | 10/1963 | Rodwell | 176—60 X |
| 3,132,998 | 5/1964 | Long et al. | |
| 3,170,846 | 2/1965 | Blumberg | 176—60 X |

FOREIGN PATENTS

| 1,327,942 | 4/1963 | France. |
| 1,332,043 | 6/1963 | France. |
| 1,345,745 | 11/1963 | France. |

OTHER REFERENCES

Muller, German application No. 1,126,527, printed March 29, 1962 (KL 21g 21/20), 2 pp. spec.; 1 sht. dwg.

LEON D. ROSDOL, *Primary Examiner.*

L. DEWAYNE RUTLEDGE, *Examiner.*